(12) United States Patent
Montojo et al.

(10) Patent No.: US 9,094,969 B2
(45) Date of Patent: *Jul. 28, 2015

(54) METHOD AND APPARATUS FOR DATA AND CONTROL MULTIPLEXING

(71) Applicant: QUALCOMM Incorporated, San Diego, CA (US)

(72) Inventors: Juan Montojo, Nuremberg (DE); Durga Prasad Malladi, San Diego, CA (US); Serge Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/751,483

(22) Filed: Jan. 28, 2013

(65) Prior Publication Data

US 2013/0136112 A1      May 30, 2013

Related U.S. Application Data

(63) Continuation of application No. 11/847,307, filed on Aug. 29, 2007, now Pat. No. 8,363,606.

(60) Provisional application No. 60/842,619, filed on Sep. 5, 2006.

(51) Int. Cl.
*H04W 72/04* (2009.01)
*H04L 27/26* (2006.01)
*H04L 1/06* (2006.01)
(Continued)

(52) U.S. Cl.
CPC ......... *H04W 72/044* (2013.01); *H04L 27/2602* (2013.01); *H04L 1/06* (2013.01); *H04L 5/0044* (2013.01); *H04L 5/0053* (2013.01); *H04L 5/14* (2013.01)

(58) Field of Classification Search
None
See application file for complete search history.

(56) References Cited

U.S. PATENT DOCUMENTS

| 6,463,042 | B1 | 10/2002 | Paatelma |
| 7,447,504 | B2 | 11/2008 | Lohr et al. |
| 8,363,606 | B2 * | 1/2013 | Montojo et al. ............... 370/329 |

(Continued)

FOREIGN PATENT DOCUMENTS

| CN | 1819673 A | 8/2006 |
| EP | 1304825 A1 | 4/2003 |

(Continued)

OTHER PUBLICATIONS

"Physical layer aspects for evolved Universal Terrestrial Radio Access(UTRA)(Release 7)", 3GPP, pp. 20-22, 71-80, 3GPP TR 25.814 V7.1.0, Jun. 15, 2006.

(Continued)

*Primary Examiner* — Brian Roberts
(74) *Attorney, Agent, or Firm* — Dalei Dong

(57) ABSTRACT

System(s) and method(s) are provided for transmitting data code symbols and control code symbols spanning disparate transmission time intervals in the uplink. Data and control symbols that overlap in time-domain within a transmission time interval are multiplexed and transmitted employing resources scheduled for data transmission, whereas data and control code symbols that are not multiplexed are transmitted in respective allocated resources. Multiplexing in conjunction with localized and distributed resource scheduling preserves the single-carrier characteristics of a single-carrier frequency division multiple access system.

28 Claims, 13 Drawing Sheets

(51) Int. Cl.
*H04L 5/00* (2006.01)
*H04L 5/14* (2006.01)

(56) References Cited

U.S. PATENT DOCUMENTS

| | | |
|---|---|---|
| 2003/0165183 A1 | 9/2003 | Ketchum |
| 2004/0009786 A1 | 1/2004 | Terry |
| 2006/0262871 A1 | 11/2006 | Cho et al. |
| 2007/0004465 A1 | 1/2007 | Papasakellariou et al. |
| 2007/0009054 A1 | 1/2007 | Kwak et al. |
| 2007/0014272 A1 | 1/2007 | Palanki et al. |
| 2007/0058584 A1 | 3/2007 | Sutskover |
| 2007/0171849 A1 | 7/2007 | Zhang et al. |
| 2007/0171864 A1 | 7/2007 | Zhang et al. |
| 2007/0183384 A1 | 8/2007 | Kwak et al. |
| 2007/0297386 A1 | 12/2007 | Zhang et al. |

FOREIGN PATENT DOCUMENTS

| | | |
|---|---|---|
| EP | 1720310 A2 | 11/2006 |
| EP | 1811701 A2 | 7/2007 |
| JP | 2006314110 A | 11/2006 |
| JP | 2009522911 A | 6/2009 |
| KR | 20050122258 | 12/2005 |

OTHER PUBLICATIONS

3GPP TR 25.814 V1.0.1; "3rd Generation Partnership Project; Technical Specification Group Radio Access Network; Physical Layer Aspects for Evolved UTRA (Release 7)," 3GPP TR 25.814 version 1.0.1, XP002436402, pp. 42-46, 2005.
European Search Report—EP11005004—Search Authority—Berlin—Jul. 26, 2011.
Huawei: "Further consideration on multiplexing method of Shared Control Channel in Uplink Single-Carrier FDMA" Internet Citation, [Online] Nov. 7, 2005, XP002451165, Seoul, Korea, Retrieved from the Internet: URL:http//www.3gpp.org/ftp/tsg_ran/WG1_RL1/TSGR1.
International Search Report—PCT/US2007/077516, International Searching Authority—European Patent Office—Mar. 12, 2008.
Mapping position of control channel for Uplink SC-FDMA, TSG-RAN WG1 #43, R1-0513954, Nov. 7, 2005.
NTT DoCoMo, et al., "Multiplexing Method of Shared Control Channel in Uplink Single-Carrier FDMA Radio Access," TSG RAN WG1 #42bis, Document #R1-051143 (Original R1-050591), pp. 1-9, XP002450609, Oct. 10-14, 2005.
NTT Docomo et al: "Views on TTI Length in E-UTRA", 3GPP Draft; R1-062087 TTI Length, 3rd Generation Partnership Project (3GPP), Mobile Competence Centre ; 650, Route Des Lucioles ; F-06921 Sophia-Antipolis Cedex ; France, vol. RAN WG1, no. Tallinn ; Aug. 23, 2006, XP050102632, [ retrieved on Aug. 23, 20063].
Physical Layer Aspects for Evolved UTRA (Release 7), 3GPP TR 25.814 Vl. 0. 1, Nov. 2005 Mapping position of control channel for Uplink SCFDMA, TSG-RAN WG1 #43, R1-0513954, 2005.
QUALCOMM Europe; "Considerations on Multiplexing of Control and User Data for xFDMA based E-UTRA Uplink Evaluation," 3GPP TSG-Ran WG1 #42bis, Document #R1-051102, San Diego, CA, USA, pp. 1-6, XP002446638, Oct. 10, 2005.
Samsung, "Data and Control Channel Multiplexing in SC-FDMA for EUTRA Uplink," 3GPP TSG RAN WG1 Meeting #43, Document #R1-051343, Seoul, Korea, XP002450962, Nov. 7-11, 2005.
Scheduling and Multiplexing of CQI and ACK/NACK Feedback for Single Carrier FDMA in Evolved UTRA Uplink, TSG-RAN WG1 WG1 LTE Ad Hoc Meeting R1-060155, Jan. 23, 2006.
Taiwan Search Report—TW096133087—TIPO—May 22, 2011.
Written Opinion—PCT/US2007/077516, International Searching Authority—European Patent Office—Mar. 12, 2008.

\* cited by examiner

METHOD AND APPARATUS FOR DATA AND CONTROL MULTIPLEXING

CROSS-REFERENCE TO RELATED APPLICATION

The present application is a continuation of U.S. patent application Ser. No. 11/847,307, entitled "METHOD AND APPARATUS FOR DATA AND CONTROL MULTIPLEXING" filed Aug. 29, 2007, pending, which claims the benefit of U.S. Provisional Application Ser. No. 60/842,619, entitled "A METHOD AND APPARATUS FOR DATA AND CONTROL MULTIPLEXING," filed Sep. 5, 2006. The entire contents of which are incorporated by reference herein in their entirety.

BACKGROUND

I. Field

The subject specification relates generally to wireless communications, and particularly to transmission of uplink control and data code symbols that span a one or more transmission time intervals.

II. Background

Wireless communication has penetrated nearly every aspect of a person's daily routine. To facilitate work/office activities as well as leisure activities, wireless systems are widely deployed to provide various types of communication content such as voice, data, video, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA), and orthogonal frequency division multiple access (OFDMA) systems.

As users demand more of such wireless systems, third generation long term evolution (3G LTE) systems have emerged as a new generation of wireless environments that can offer high-speed data rates, higher capacity, reuse of legacy platforms/systems, and low latency. The latter is among a key element in providing a superior user experience, or quality of service, among market segments with high consumption potential. Specific applications such as multi-player on-line gaming and remote virtual office deployments require low latency communications, and users can gravitate toward service providers that deliver such low-latency services.

To attain low latency, while maintaining low complexity and efficient power use at the user equipment, 3G LTE systems rely on asymmetric communication links: Forward link (or downlink) uses orthogonal frequency division multiple access, where transmission is effected by sending data and control code symbols on a plurality of subcarriers in order to increase data rates and cell capacity; and reverse link (or uplink) employs single-carrier frequency division multiple access, which affords low peak-to-average power ratio and the ensuing efficient use of power resources at the terminal. Thus, any advance on data rate and capacity increase, as well as latency needs to preserve such characteristics of the downlink and uplink. In particular, to lower latency there is a need to transmit DL data/control code symbols with short transmission time intervals (TTIs), while receiving UL control code symbols transmitted in SC-FDMA with sufficiently long TTIs (typically longer that DL data TTI) so as to adequately convey control information, e.g., channel quality indicators, interference levels, terminal capabilities and conditions, . . . . Increased terminal and processing complexity can be acceptable depending on the gains in reducing latency.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with an aspect, the innovation provides a system utilized in wireless communications, comprising a processor configured to receive an allocation of resources to transmit data and control symbols, wherein transmission of control symbols occurs in a primary transmission time interval (TTI) and transmission of data symbols occurs in a secondary TTI, said primary TTI exceeds said secondary TTI; to multiplex data and control symbols that are transmitted within a common time period, and to employ allocated resources for data transmission to convey the multiplexed symbols; and to employ allocated control resources to transmit control symbols, if the data and control symbols are not multiplexed. In addition, the system comprises a memory coupled to the processor to store data.

In another aspect, an apparatus utilized in wireless communication systems, the apparatus comprising: means for employing a set of allocated resources for data transmission to transmit multiplexed data and control symbols conveyed within a transmission time interval; and means for employing a set of allocated control resources to transmit control symbols, if the data and control symbols are not multiplexed.

In yet another aspect, an apparatus that operates in a wireless communication environment, the apparatus comprising: a processor configured to schedule resources for transmitting data code symbols and control code symbols, and to receive data symbols multiplexed with control symbols, wherein the transmitted multiplexed code symbols utilize the resources scheduled to a data transmission; and memory coupled to the processor to store data.

In accordance with another aspect, an apparatus that facilitates communication in a wireless environment, the apparatus comprising: means for determining a received stream of code symbols is a stream of multiplexed data code symbols and control code symbols; and means for demultiplexing a the stream of data code symbols and control code symbols, if determined the symbols are multiplexed.

According to yet another aspect, a method employed in a wireless communication system, the method comprising: receiving scheduled resources for transmitting data and control code symbols; determining at specific time intervals whether data and control code symbols are transmitted; multiplexing the data and the control code symbols, if determined that the data and the control code symbols are transmitted within the specific time interval, and transmitting the multiplexed code symbols employing the allocated resources for data transmission; and transmitting the control and the data code symbols on respective allocated resources, if the data symbols are not transmitted within the specific time TTI.

In still another aspect, a machine-readable medium comprising instructions which, when executed by a machine, cause the machine to perform operations including: multiplexing data and control code symbols, if the data symbols are transmitted within a control transmission time interval (TTI), and transmitting the multiplexed code symbols employing a set of scheduled resources for data transmission; and transmitting the control and data code symbols on respective sets of scheduled resources, if the data symbols are not transmitted in the control TTI.

A machine-readable medium with instructions stored thereon that, when executed by a processor, cause the machine to carry out the following acts: transmitting a first set of data code symbols in a first transmission time interval (TTI); receiving control code symbols in a second TTI that encompasses that the first TTI; and receiving control code symbols multiplexed with data code symbols from a second set of data symbols, if the data code symbols in the second set are transmitted within the control TTI.

In yet another aspect, a method employed in a wireless communication environment, the method comprising: scheduling an allocation of resources for transmitting data and control code symbols; receiving a stream of code symbols and determining that data code symbols and control code symbols are multiplexed in the resources allocated to data transmission; and de-multiplexing the multiplexed data and control code symbols in the allocated resources for data transmission.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
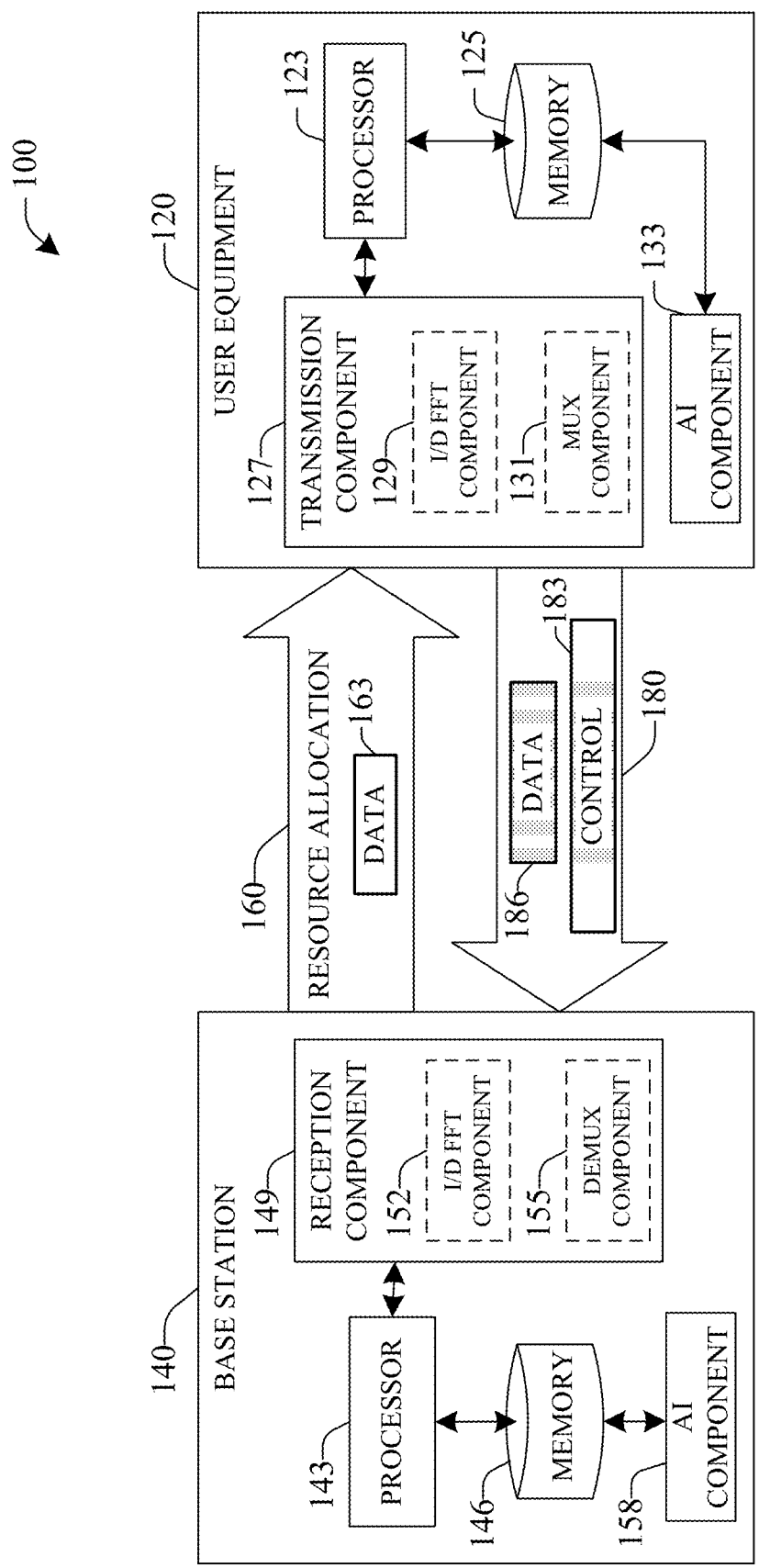
FIG. 1 is a block diagram of a system that facilitates transmission and reception of control and data code symbols in accordance with an aspect of the subject specification.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, evolved Node B (eNodeB), or some other terminology.

As employed herein the word "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a programmable logic controller (PLC), a complex programmable logic device (CPLD), or a field programmable gate array (FPGA). Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment.

In this description, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems and/or methods herein are intended to comprise, without being limited to, these and any other suitable types of memory.

A system and method(s) facilitate communication of data and control code symbols in the uplink of a wireless communication system. Data and control code symbols can span a plurality of transmission time intervals, and those code symbols that overlap in time-domain within a TTI are multiplexed and transmitted on scheduled resources for data transmission. Control symbols that are not multiplexed are transmitted in scheduled dedicated resources for control transmission. The system and methods are described in greater detail below.

FIG. 1 illustrates a system 100 that facilitates communication of data code symbols and control code symbols according to an aspect of the subject innovation. The embodiment 100 comprises user equipment 120 and base station 140 that communicates wirelessly through communication downlink (DL) 160 and uplink (UL) 180. User equipment 120 can receive, via downlink 160, an allocation of resources to transmit (uplink) data and (uplink) control code symbols. Additionally, the terminal can receive data 163, which can be transmitted in DL 160, in a specific transmission time interval (TTI). It is noted that DL control code symbols can also be transmitted over the downlink with a different TTI (not shown).

In an aspect, downlink transmission can be accomplished through orthogonal frequency division multiplexing (OFDM). In response to data 163 received over downlink 160, user equipment 120 can transmit control acknowledgment/negative acknowledgment (ACK/NACK) signals. Moreover, transmitted control code symbols 183 can include, channel conditions (e.g., signal-to-noise ratio, signal-to-interference-and-noise ratio), buffer (which can be embodied in memory 125) status, antenna selections, power control data, neighbor cell measurements, etc. The UL control 183 can be sent over a transmission time interval that can be different from data 163 downlink TTI. Furthermore, UE 120 can transmit data 186 over uplink 180. Such data can be generated by a user of the terminal (e.g., voice), or it can be generated by processor 123, e.g., uploading a file, instructions or results of a computation into a server (not shown) connected to base station 140. In an aspect, uplink 180 transmission can be accomplished via single-carrier frequency division multiple access (SC-FDMA), which is the case in 3G LTE. UL data 186 can be sent over a TTI that is different than UL control 183 TTI. To summarize, it is contemplated herein that data 163 transmitted in downlink 160 can have a first TTI, UL control 183 can have a second TTI, and UL data 186 can have a third TTI. In FIG. 1, these different TTIs are pictorially indicated with boxes of disparate sizes, and in the example representation of FIG. 1, UL control TTI is longer than UL data TTI.

In the subject innovation, to facilitate the disparity of control 183 and data 186 TTIs, and to preserve the characteristics of a UL transmission that can be implemented as SC-FDMA, control code symbols and data code symbols transmitted in overlapping TTIs (over the wireless channel that holds downlink 160 and uplink 180) are multiplexed (by UE 120, utilizing, for example, multiplexing (MUX) component 131 via processor 123) prior to transmission employing scheduled resources for data transmission. For resources that are scheduled (by based station 140, for example) appropriately (see below; FIG. 4C), such multiplexing can preserve the single-carrier characteristic of a reverse link (or uplink). In FIG. 1, multiplexing of data and control code symbols is pictorially indicated with grey bars (see also FIG. 4A). UL data and control code symbols that are not multiplexed are transmitted (by UE 120, for example) in their respective scheduled resources. In an aspect, resources allocated for transmission of control symbols can span a dedicated frequency region of the UL; such a region is divided in frequency subcarriers, and the range of such reserved region depends on the operating wireless system specifications, such as system bandwidth and subcarrier spacing.

It should be appreciated that transmission of multiplexed data can be UE-centric, and, as mentioned above, it can be necessary to preserve the single-carrier characteristic of an uplink 180. A multiplexed code symbol stream transmitted by a wireless device (e.g., UE 120) can be received by an access point (e.g., base station 140), which can determine whether UL control and UL data are multiplexed. In an aspect, such determination proceeds by checking whether code symbols have been received in the frequency region dedicated for a physical uplink control channel (PUCCH) at a time scheduled to receive control symbols, if no code symbols have been received, base station determines that control and data symbols are multiplexed. It should be appreciated that such determination scheme relies on the fact that an access point (e.g., base station 140) has information related to when UL control code symbols should be expected. Access point demultiplexes the received symbol stream once it has been determined that data and control are multiplexed. In embodiment 100, base station 140 includes a reception component 149 that can execute the determination describe above and demultiplex control and data symbols. Processor 143 can manage those acts. To the accomplishment of such determination and multiplexing, component 149 utilizes a two-purpose inverse/direct fast Fourier transform (I/D FFT) component 152 and a demultiplexing (DEMUX) component 155: I/D FFT component 152 transforms the received signal from time-domain to frequency-domain (e.g., direct FFT) and examines whether subcarriers in the region reserved for PUCCH contain non-zero coefficients, in the negative case the data stream is demultiplexed by DEMUX component 155.

Hereinafter, scenarios wherein transmission of UL control and data code symbols can require multiplexing are provided. Exemplary transmission of DL data and UL control with disparate transmission time intervals are also presented. System(s) wherein transmission of DL/UL data and control can take place are discussed next.

Figure 2:
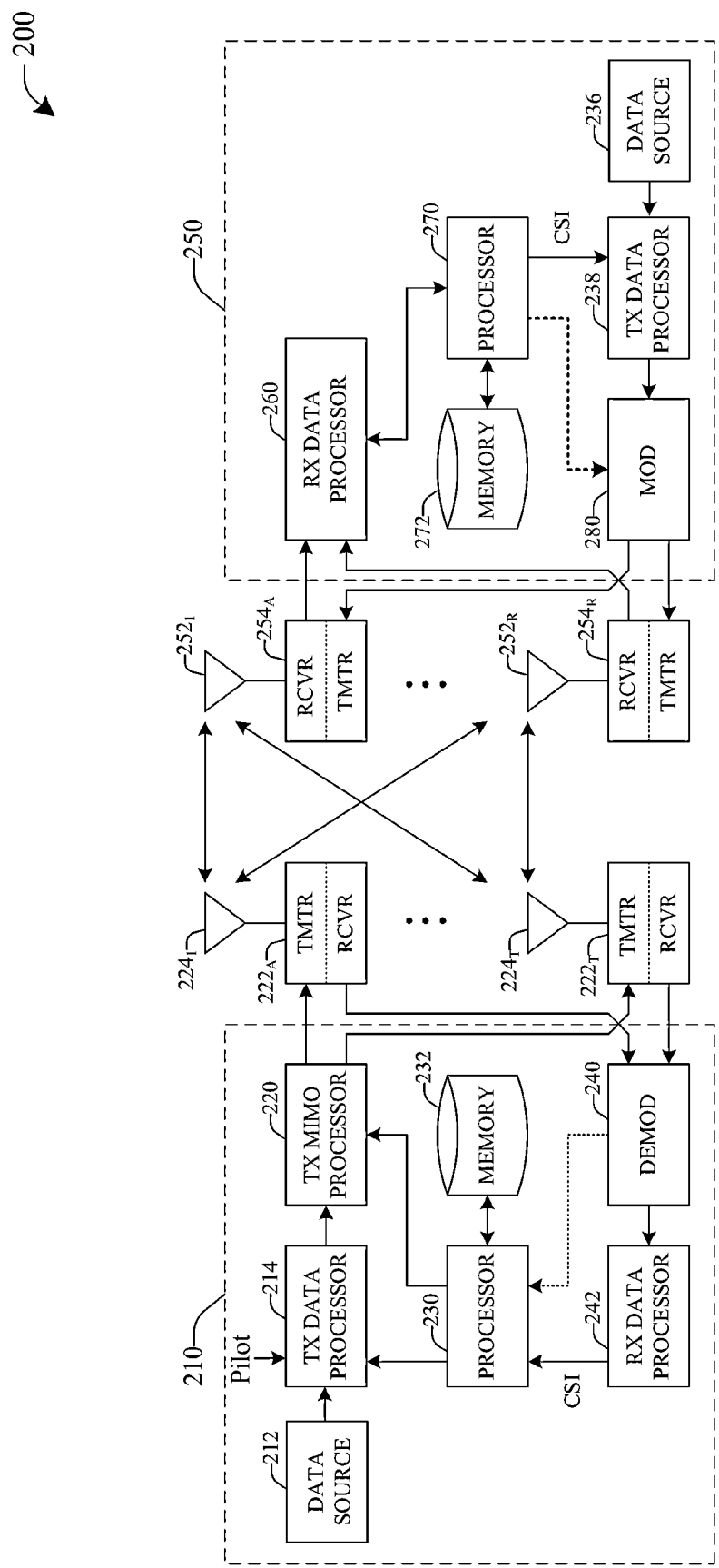
FIG. 2 is a block diagram of MIMO transmitter and a receiver.

FIG. 2 is a block diagram of an embodiment of a transmitter system 210 (such as base station 140) and a receiver system 250 (e.g., user equipment 120) in a multiple-input multiple-output (MIMO) system that can provide for sector communication in a wireless communication environment in accordance with one or more aspects set forth herein. At the transmitter system 210, traffic data for a number of data streams can be provided from a data source 212 to transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme [e.g., binary phase-shift keying (BPSK), quadrature phase-shift keying (QPSK), multiple phase-shift keying (M-PSK), or m-order quadrature amplitude modulation (M-QAM)] selected for that data stream to provide modulation symbols. The data rate, coding, and modulation for each data stream may be determined by instructions executed by processor 230.

The modulation symbols for all data streams are then provided to a TX MIMO processor 220, which may further process the modulation symbols (e.g., OFDM). TX MIMO processor 220 then provides $N_T$ modulation symbol streams to $N_T$ transceivers (TMTR/RCVR) $222_A$ through $222_T$. In certain embodiments, TX MIMO processor 220 applies beamforming weights (or precoding) to the symbols of the data streams and to the antenna from which the symbol is being transmitted. Each transceiver $222_A$-$222_T$ receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $222_A$ through $222_T$ are then transmitted from $N_T$ antennas $224_1$ through $224_T$, respectively. At receiver system 250, the transmitted modulated signals are received by $N_R$ antennas $252_1$ through $252_R$ and the received signal from each antenna 252 is provided to a respective transceiver (TMTR/RCVR) $254_A$ through $254_S$. Each receiver $254_A$-$254_R$ conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ transceivers $254_A$-$254_R$ based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use (discussed below). Processor 270 formulates a reverse link message comprising a matrix index portion and a rank value portion. The reverse link message may comprise various types of information regarding the communication link or the received data stream, or a combination thereof. The reverse link message is then processed by a TX data processor 238, which also receives traffic data for a number of data streams from a data source 236, modulated by a modulator 280, conditioned by transceiver $254_A$ through $254_R$, and transmitted back to transmitter system 210.

At transmitter system 210, the modulated signals from receiver system 250 are received by antennas $224_1$-$224_T$, conditioned by transceivers $222A$-$222_T$, demodulated by a demodulator 240, and processed by a RX data processor 242 to extract the reserve link message transmitted by the receiver system 250. Processor 230 then determines which pre-coding matrix to use for determining the beamforming weights and processes the extracted message.

Single-user MIMO mode of operation corresponds to the case in which a single receiver system 250 communicates with transmitter system 210, as illustrated in FIG. 2 and according to the operation described above. In such a system, the $N_T$ transmitters $224_1$-$224_T$ (also known as TX antennas) and $N_R$ receivers $252_1$-$252_R$ (also known as RX antennas) form a matrix channel (e.g., Rayleigh channel, or Gaussian channel) for wireless communication. The SU-MIMO channel is described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to min $\{N_T, N_R\}$. A MIMO channel formed by the $N_T$ transmit and $N_R$ receive antennas may be decomposed into $N_V$ independent channels, which are also referred to as spatial channels, where $N_V \leq \min\{N_T, NR\}$. Each of the $N_V$ independent channels corresponds to a dimension.

In one aspect, transmitted/received symbols with OFDM, at tone ω, can be modeled by:

$$y(\omega)=H(\omega)c(\omega)+n(\omega). \quad (1)$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 210, and $N_V$ can be scheduled at the discretion of the transmitter (e.g., base station 140) based at least in part on channel conditions and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 210 allocates to transmit each data stream $N_V$. The net power employed in the transmission is upper-bounded by the regulated value of transmit power for a transmitter in wireless communications.

In system 200 (FIG. 2), when $N_T=N_R=1$, the system reduces to a single-input single-output (SISO) system that can provide for sector communication in a wireless communication environment in accordance with one or more aspects set forth herein.

Figure 3:
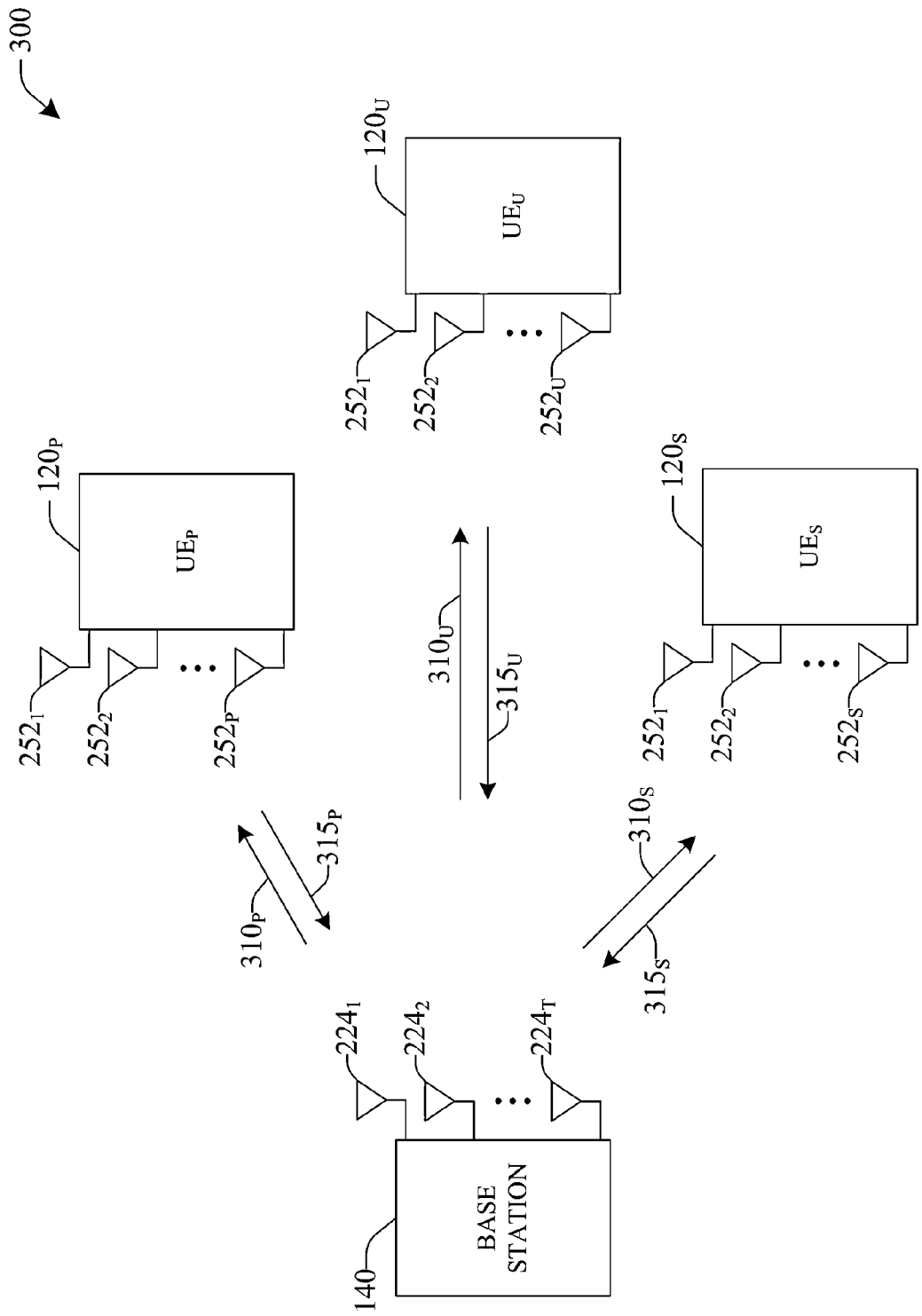
FIG. 3 is a block diagram of a MU-MIMO configuration.

FIG. 3 illustrates an exemplary multiple-user MIMO system 300 in which three UEs $120_P$, $120_U$, and $120_S$ communicate with a base station 140. Base station has $N_T$ TX antennas $224_1$-$224_T$, and each of the UE has multiple RX antennas; namely, $UE_P$ has $N_P$ antennas $252_1$-$252_P$, $UE_U$ has $N_U$ antennas $252_1$-$252_U$, and $UE_S$ has $N_S$ antennas $252_1$-$252_S$. Communication between terminals and the base station is effected through uplinks $315_P$, $315_U$, and $315_S$. Similarly, downlinks $310_P$, $310_U$, and $310_S$ facilitate communication between base station 140 and terminals $UE_P$, $UE_U$, and $UE_S$, respectively. Additionally, communication between each terminal and base station is implemented in substantially the same manner, through substantially the same components, as illustrated in FIG. 2 and its corresponding description. Because terminals can be located in substantially different locations within the cell serviced by base station 140, each terminal $120_P$, $120_U$, and $120_S$ has its own matrix channel $h_\alpha$ and response matrix $H_\alpha$ ($\alpha=P$, U, and S), with its own rank. Intra-cell interference can be present due to the plurality of users present in the cell serviced by the base station 140. Although illustrated with three terminals in FIG. 3, it should be appreciated that a MU-MIMO system can comprise any number of terminals, indicated below with index k.

In one aspect, transmitted/received symbols with OFDM, at tone ω and for user k, can be modeled by:

$$y_k(\omega)=H_k(\omega)c_k(\omega)+H_k(\omega)\Sigma'c_m(\omega)+n_k(\omega). \quad (2)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $c_k$ is excluded from the summation. The terms in the series represent reception by user k (through its channel response $H_k$) of symbols transmitted by a transmitter (e.g., base station 140) to the other users in the cell. Inter-cell interference determines at least in part the channel conditions, and thus it is readily apparent that channel state information at the transmitter (CSIT) determined in MU-MIMO operation can be intrinsically different from CSIT in SU-MIMO operation discussed above.

Figure 4A:
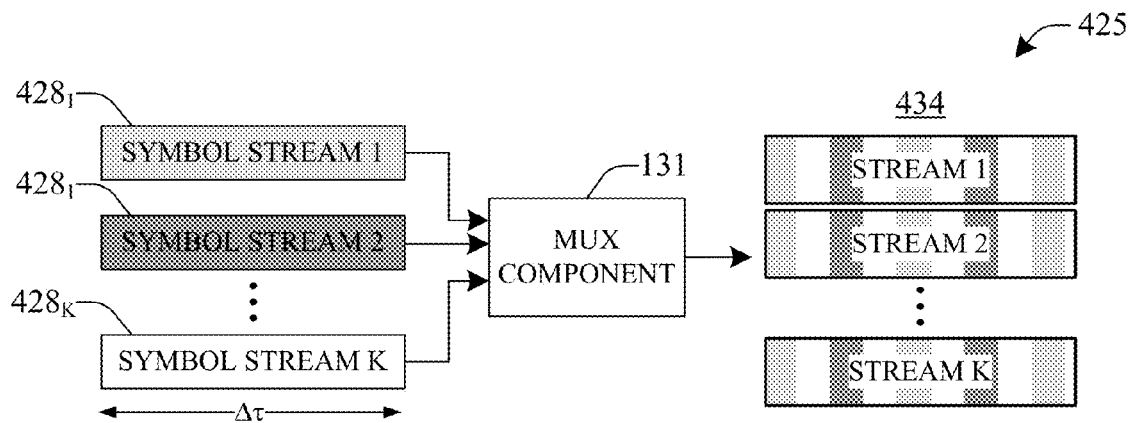
FIGS. 4A, 4B, and 4C illustrate transmission of UL control and UL data in accordance with an aspect of the subject specification.

FIG. 4A illustrates an example multiplexing 425 in which a MUX component 131 multiplexes K streams of code symbols $428_1$-$428_K$. Symbol streams $428_1$-$428_K$ can span a time interval Δτ which can correspond to the transmission time interval of one of the streams, but not necessarily of them all. In time interval Δτ, a wireless device (e.g., user equipment 120) can employ a multiplexing component (e.g., MUX component 131) to transmit the symbols in streams $428_1$-$428_N$ over a wireless channel (e.g., the channel that holds DL 160 and UL 180). In an aspect, multiplexing preserves waveform in single-carrier transmitter architecture when transmitting data in an overlapping time interval (e.g., Δτ). Multiplexing component 131 can employ time-division multiplexing (TDM) or frequency division multiplexing (FDM) to generate a single stream of symbols 434. It should be appreciated that the resulting single stream of symbols 434 is pictorially represented in a diagram that reflects the identity of the streams that have been multiplexed, while indicating via color exchange that the resulting single stream has been multi-plexed (it is noted that only color of rendered streams $428_1$, $428_2$ and $428_K$ have been used in the color exchange). Such representation is adopted for explanation purposes, and it should be noted that to recover such identity a demultiplexing device (e.g., DEMUX component 155) can be used upon detecting the resulting, multiplexed single stream of symbols.

Figure 4B:
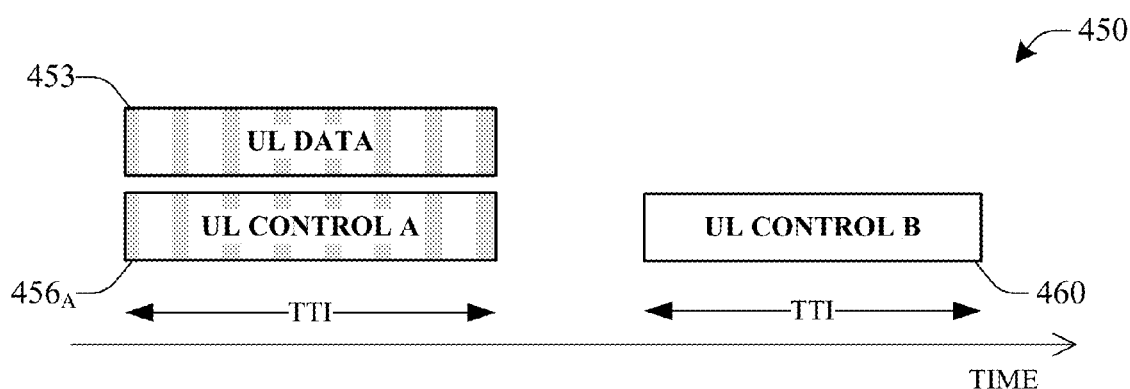
Figure 4C:
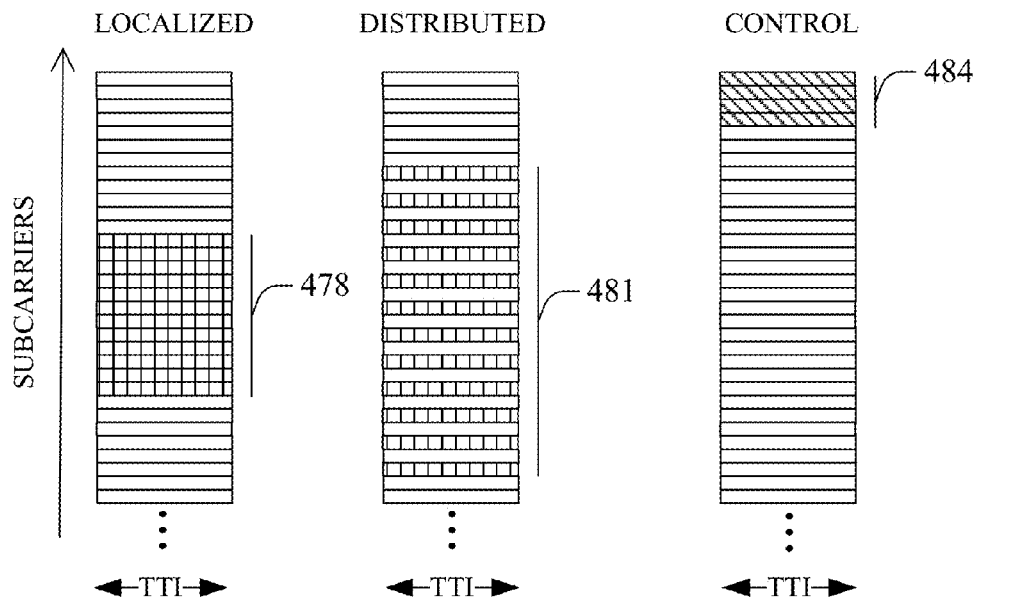

Referring to FIG. 4B, the multiplexing representation of FIG. 4A is employed to illustrate, in a diagram 450, the multiplexing of UL data code symbols 453 and UL control symbols $456_A$ spanning the same TTI, discussed above in connection with FIG. 1. As UL data and UL control are to be transmitted in the same TTI, these code symbols are multiplexed (indicated in a color-block exchange diagram). The multiplexed stream can be transmitted in resources scheduled (by a Node B such 140) for data transmission. In an aspect, the transmission of the multiplexed stream can be performed using SC-FDMA. In such a case, resources allocated for data transmission can be scheduled as illustrated in diagram 475 in FIG. 4C: In a localized manner (e.g., a localized 12-subcarrier block 478 is scheduled for data transmission), or in a distributed fashion (e.g., a distributed set of 12 subcarriers 481 are allocated with an interleave of 1 carrier). Similarly, in an instance in which data is not to be transmitted, UL control symbols are not multiplexed and control symbols are transmitted in a dedicated frequency region (e.g., reserved region illustrated with a set of four subcarriers 484), as discussed above.

It should be appreciated that in FIG. 4C the resources are described in terms of subcarriers in the frequency domain, although the transmission of data and control symbols, multiplexed or not, is carried out with a single carrier. It is noted that the subcarriers are allocated on a per TTI basis. Moreover, localized allocations, or frequency selective scheduling, and distributed allocations, or frequency diverse scheduling, are typical allocations of resources that preserve the single-carrier form in an SC-FDMA architecture for wireless communication. The number of subcarriers available for scheduling resources for data and control transmission depends on the bandwidth of the wireless system employed in the communication. In an aspect, in a 3G LTE system with 20 MHz bandwidth there are 1200 subcarriers. Additionally, these subcarriers are allotted in blocks of 12; each of these blocks is a resource block. Example block 484 represents the dedicated resources for the PUCCH.

Figure 5:
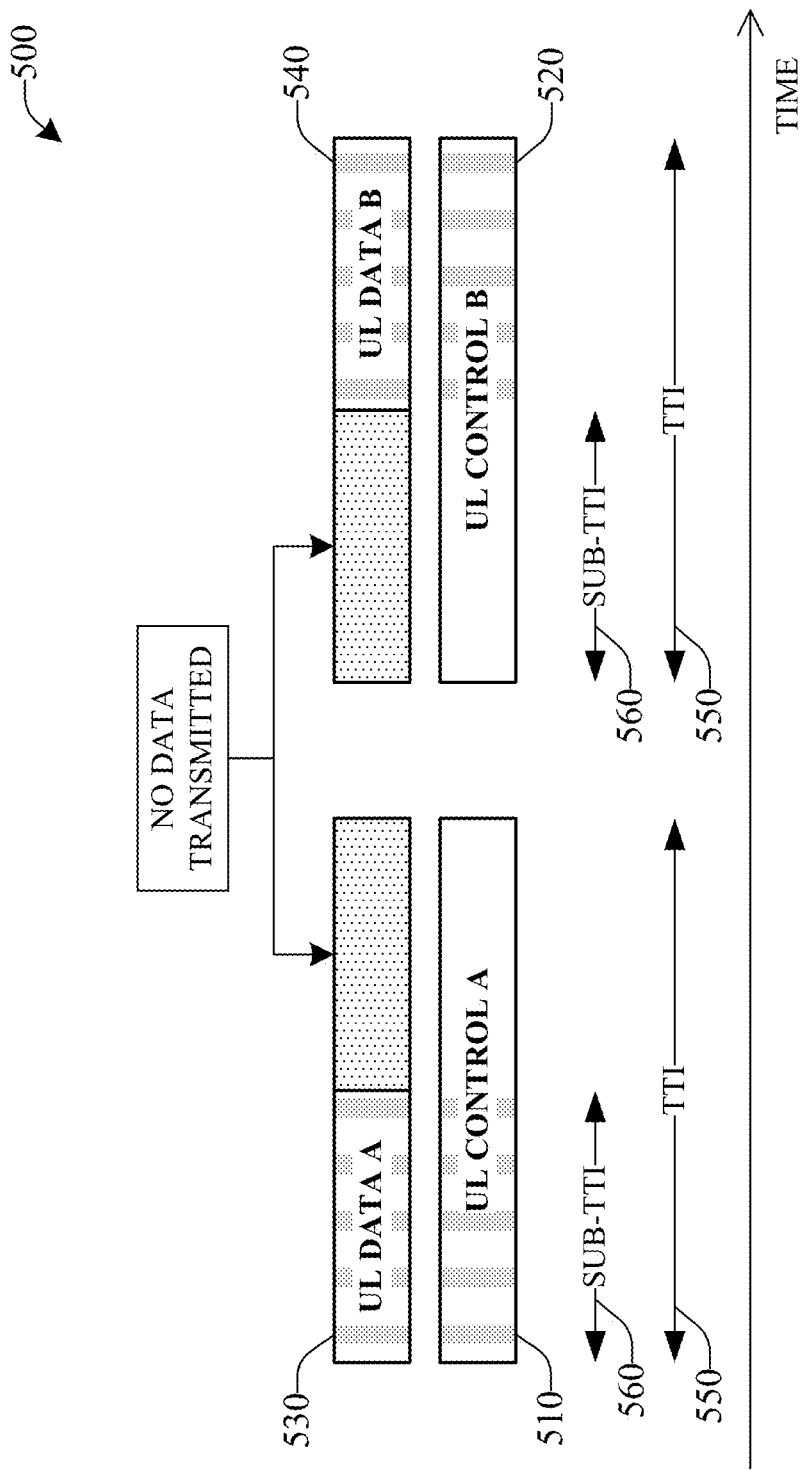
FIG. 5 illustrates the transmission of UL control code symbols that span a first TTI and UL data symbols that span a second, disparate TTI.

FIG. 5 illustrates with a diagram 500 a transmission of UL control code symbols that span a first TTI and UL data symbols that span a second, disparate TTI. UL control code symbols A 510 and UL control code symbols B span TTI 550, and UL data code symbols A and B span sub-TTI 560. In an aspect, sub-TTI 540 is half TTI 530; however, it should be appreciated that the ratio between sub-TTI to TTI can be smaller than 0.5—the lowest given determined by the time span of a single symbol in addition to the time span of guard intervals, such as cyclic prefix (CP), added to the symbol. In an aspect, in 3G LTE the lowest time span corresponds to 2×5.2 μs+66.7 μs=77.1 μs, where 5.2 μs is the CP of the first of 6 (or 7, depending on CP magnitude) symbols in a sub-TTI of 0.5 ms. As discussed above, code symbols of UL data and UL control that overlap in time are multiplexed and transmitted in resources scheduled for data transmission, whereas scheduled resources for control transmission are disposed. In the case illustrated in FIG. 5, after sub-TTI has elapsed, no UL data code symbols are transmitted (as indicated in the figure) until TTI 550 has elapsed and the remaining UL control symbols 510 are transmitted in dedicated resources. At a later time, UL control B is transmitted for a period corresponding to sub-TTI 560 and code symbols are transmitted in reserved scheduled resources; afterwards, UL data B 540 and the remaining control code symbols in UL control B 530 are multiplexed and transmitted in resources scheduled for data.

It is noted that the transmission of control and data described in connection with FIG. 5, can be exploited in an embodiment wherein data transmission employs the same TTI for DL and UL communication, which can benefit from HARQ to expand transmission coverage, and a larger transmission time interval for the UL control transmission. Such a larger transmission interval for the control transmission can result from "repetition" of a time interval spanned by a basic control information block, so that the coverage of the control information can be extended without resorting to HARQ—which typically does not benefit a control communication.

Figure 6:
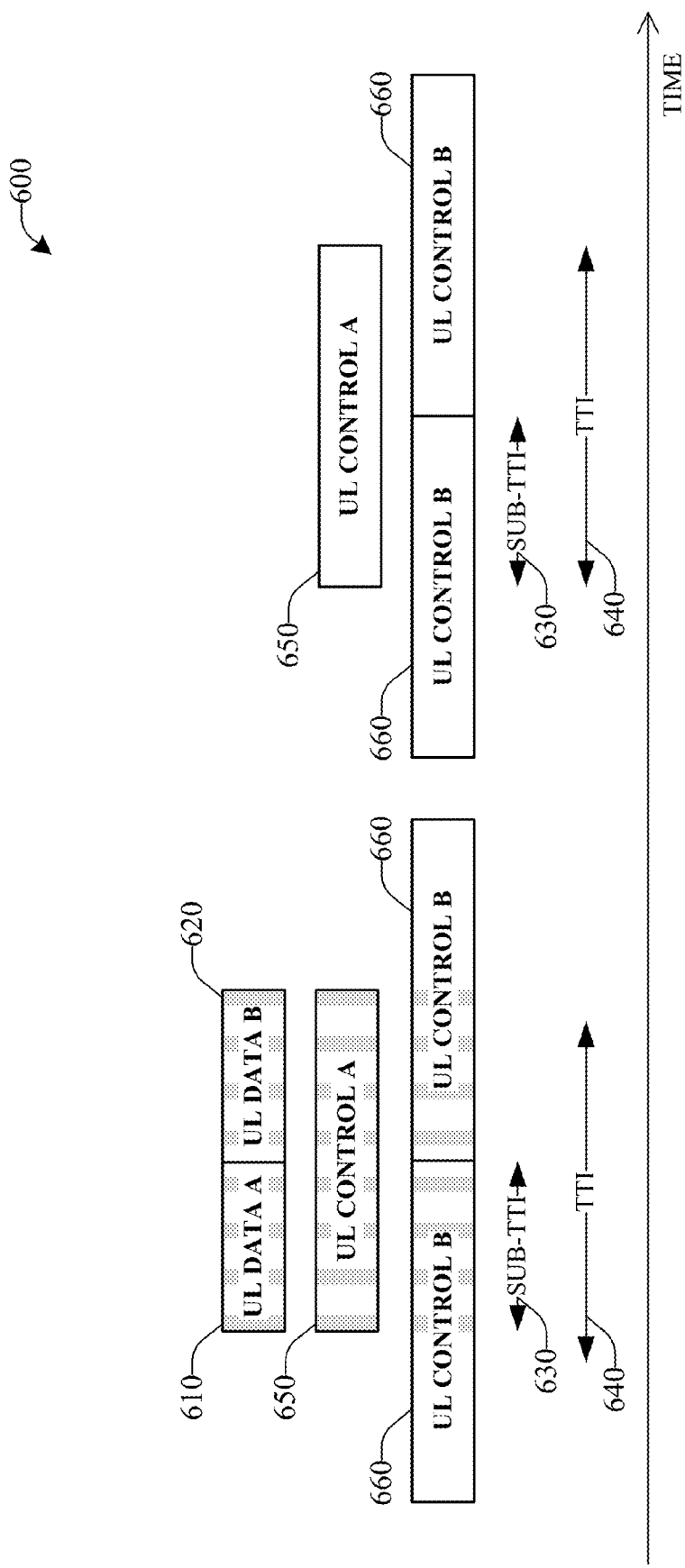
FIG. 6 illustrates the transmission of a first and second UL control code symbols that span a first TTI, and UL data symbols that span a second, disparate TTI.

FIG. 6 illustrates with a diagram 600 a transmission of a first and second UL control code symbols that span a first TTI, and UL data symbols that span a second, disparate TTI. UL data symbol stream A 610 and stream B 620 span sub-TTI 630. Transmission of both data streams spans TTI 640, which corresponds to the TTI of UL control symbols A 650 and control symbols B 660. Although the time spanned by the transmission of the disparate control symbols is the same, the transmission is "skewed" in time, e.g., UL control A transmission is shifted by sub-TTI 630. It should be appreciated that two streams of UL control symbols can arise when a terminal (e.g., user equipment 120) responds with ACK/NACK to two different DL data streams sent at sub-TTI intervals, within a data TTI (see below). As an example, it is noted that in the 3G LTE system, the control TTI is the same as the data TTI, both equal 1 ms. In an aspect, the two UL control code symbol streams can be scheduled disparate, orthogonal resources for control transmission. Additionally, the disparate scheduled resources can be localized or distributed (FIG. 4), to jointly preserve single-carrier nature of the uplink in the case transmission is effected employing SC-FDMA. In case UL data code symbols and UL control A and UL control B overlap in time, such as in the scenario depicted in FIG. 6, wherein all code symbols in control A overlap with code symbols in UL data, whereas two disparate sub-TTI portions of U control B have overlapping symbols, UL control and data are multiplexed and transmitted within resources scheduled for transmission of data. Conversely, in case no UL data control symbols are to be transmitted within the overlapping TTI of the UL control symbol streams, as illustrated at a later time in FIG. 6, UL control code symbols are transmitted utilizing dedicated scheduled resources.

Figure 7:
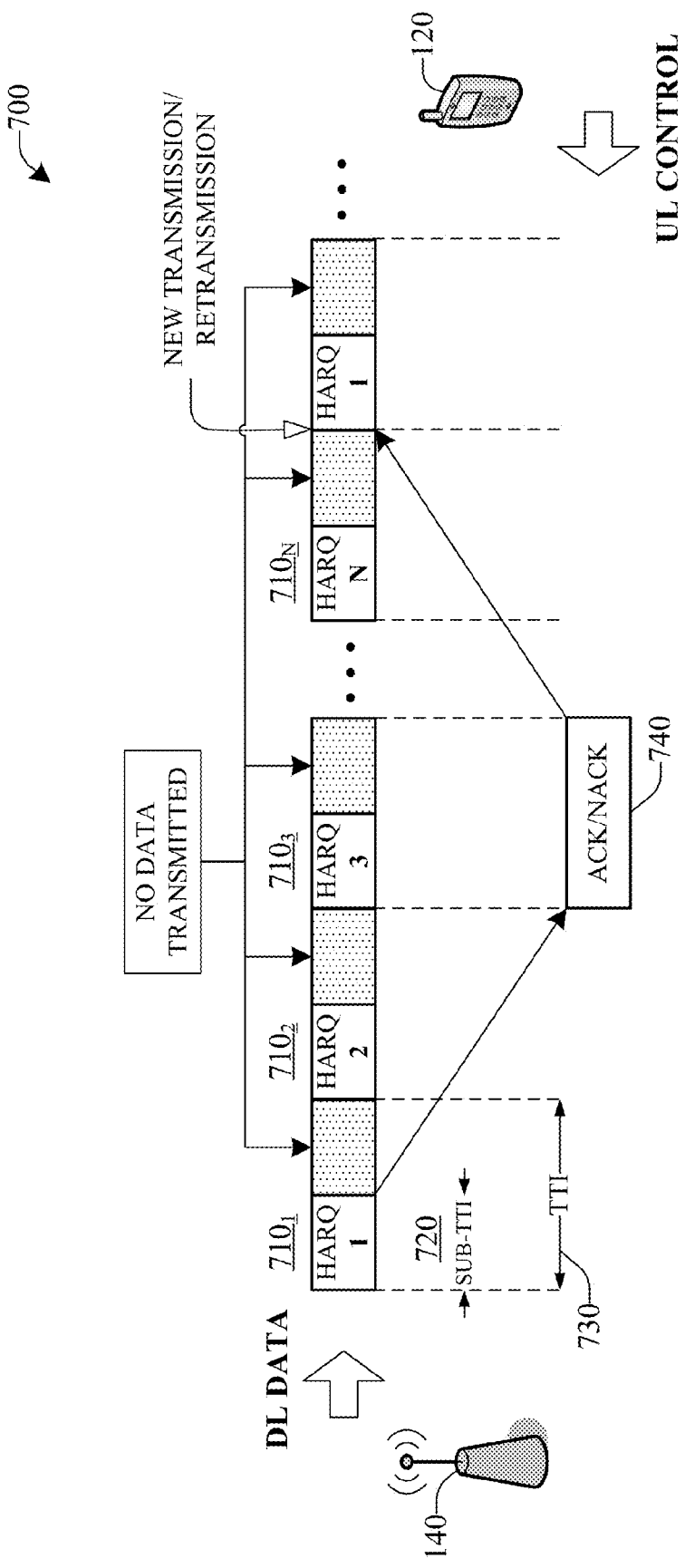
FIG. 7 illustrates transmission of DL data code symbols that span a sub-TTI and UL control code symbols that span a TTI.

As discussed in connection with FIG. 1, TTI for DL data code symbols can span disparate times. Additionally, DL data control symbols can be transmitted in a similar manner to UL data code symbols, wherein DL data symbols can be sent in a sub-TTI (FIG. 5) or every sub-TTI (FIG. 6). FIG. 7 illustrates with a diagram 700 a transmission of DL data code symbols in an N-process hybrid automated repeat request (HARQ) 710$_1$-710$_N$ in a sub-TTI 720, wherein the TTI 730 of the DL data is considered to be the same as the UL control TTI. It is noted that DL data is transmitted once every TTI. Transmitting DL data in a sub-TTI (e.g., sub-TTI 720) can reduce latency associated with DL data transmission. In the scenario depicted by FIG. 7, the UL control code corresponds to an ACK/NACK indication 740, and is transmitted by user equipment 120. In an aspect, transmission of data is facilitated by base station 140 and transmission of UL control is accomplished through user equipment 120. It should be appreciated that UL data can be sent in the scenario of FIG. 7, and transmission of UL code and data can occur in accordance with the aspects discussed hereinbefore. After ACK/NACK indication 740 is received by base station 140, for example, a new transmission is initiated, or a retransmission of the N-process HARQ is initiated.

Figure 8:
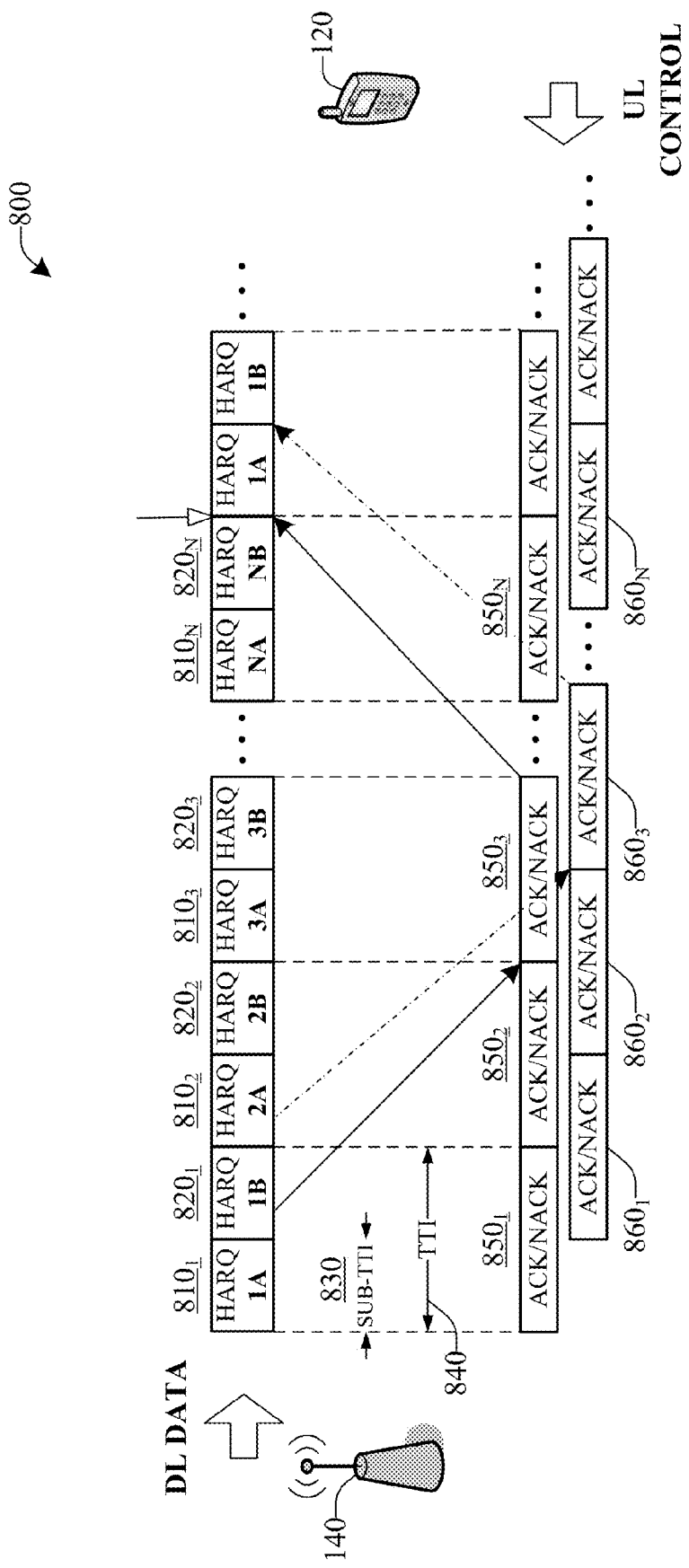
FIG. 8 illustrates an example transmission of DL data code symbols within two sub-TTIs, and two streams of UL control code symbols, in accordance with an aspect of the subject specification.

FIG. 8 illustrates with a diagram 800 a transmission of DL data code symbols 810$_1$-810$_N$ and 820$_1$-820$_N$ in an N-process HARQ, wherein data is sent in each sub-TTI 830 and two streams of UL control code symbols, 850$_1$-850$_N$ and 860$_1$-860$_N$, are received. UL control TTI 840 is the same as DL data TTI, and UL control 850 and 860 correspond to an ACK/NACK response (provided by user terminal 120, for example). Transmission of DL data 810$_1$-810$_N$ and 820$_1$-820$_N$ can result in the transmission of UL control transmission that involves three disparate UL control, e.g., 850$_3$, 860$_2$ and 860$_3$. Transmission of such UL control code symbols proceeds as discussed above in connection with FIG. 6.

It should be appreciated that due to the reciprocity between the properties of a downlink channel (e.g., DL 160) and an uplink (e.g., UL 180), the DL data transmission and UL ACK/NACK structure of FIG. 8 can be reciprocated such that UL sends (user) data and DL transmits ACK/NACK indications. A difference in such reciprocal transmission scenario is that twice as many resources are necessary to ACK/NACK data transmission of disparate UEs unambiguously.

Figure 9:
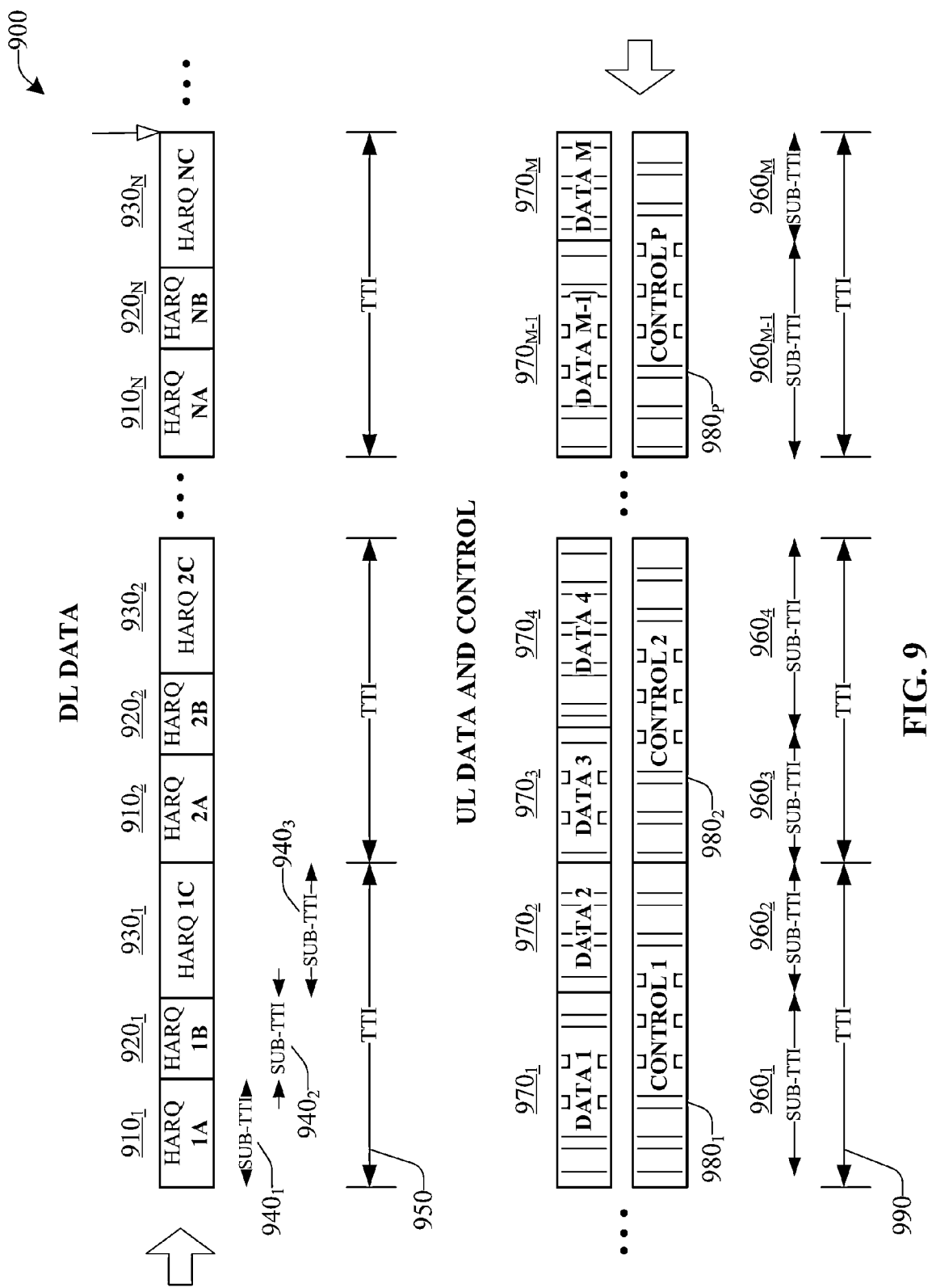
FIG. 9 illustrates transmission of DL and UL data code symbols that span more than one sub-TTI.

FIG. 9 illustrates with a diagram 900 a transmission of DL data code symbols 910$_1$-910$_N$, 920$_1$-920$_N$, and 930$_1$-930$_N$ that span three disparate sub-TTIs, 940$_1$, 940$_2$, and 940$_3$, within a TTI 950. Different sub-TTIs can exploit information diversity. A transmitter (e.g., base station 140) can select each sub-TTI in a transmission according to information to be sent over a DL (e.g., DL 160), in order to convey in each sub-TTI relevant portions of the information to be transmitted. As an example, if a TTI can accommodate seven symbols and corresponding time guards, and portions of information to be transmitted can be conveyed with two, one, and four code symbols, sub-TTIs 940$_1$, 940$_2$, and 940$_3$ can be selected to span such number of symbols, respectively, and thus convey all information within a TTI without introducing latency that can arise from sending additional symbols in a sub-TTI that do not fully convey information. It should be appreciated that for each sub-TTI interval wherein DL link data is transmitted, an UL ACK/NACK stream can be issued by terminal (e.g., UE 120) that can receives the data.

Disparate sub-TTIs 960$_1$-960$_M$ can also be employed when transmitting UL data 970$_1$-970$_M$ to exploit information diversity in substantially the same manner as in the downlink. As discussed above in connection with FIGS. 1 and 4, when such UL data overlap with a transmission of UL control code symbols 980$_1$-980$_P$, data and control are multiplexed and transmitted on resources scheduled for data transmission. It is noted that UL control TTI 990 can be different from DL data TTI 950.

In an aspect, an artificial intelligence component (e.g., AI component 133 or 158) at a transmitter (e.g., base station 140 or UE 120) can utilize information in a buffer (e.g., memory 125 or 146) to optimize sub-TTIs. Such optimization can introduce additional processing overhead, but it can reduce latency in the UL communication. The term "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. In particular, AI components 133 and 158 can employ one of numerous methodologies for learning from data and then drawing inferences from the models so constructed, e.g., hidden Markov models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing the automated aspect described hereinbefore.

Figure 10:
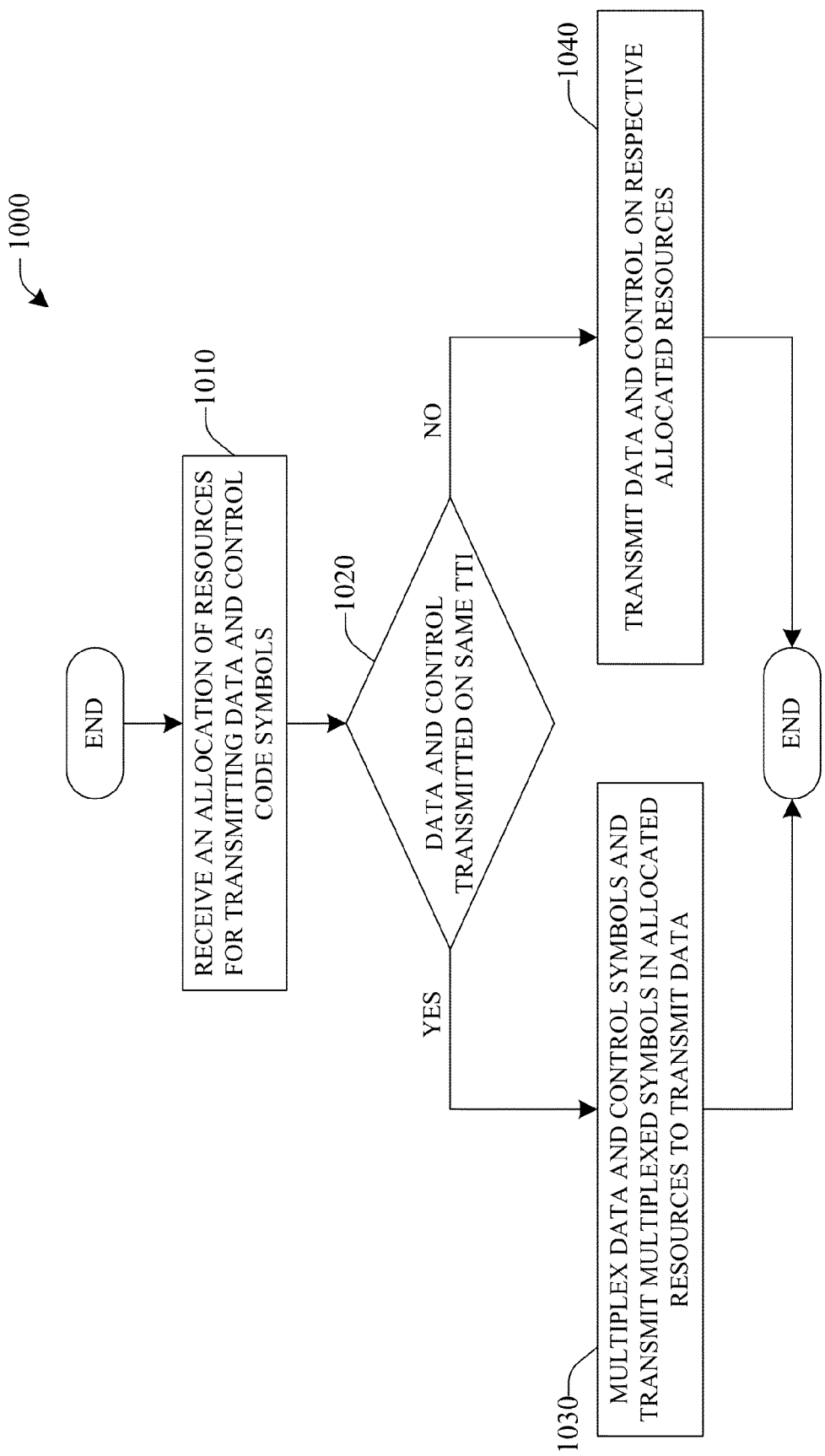
FIG. 10 is a flowchart of an example method for transmitting data and control code symbols.
Figure 11:
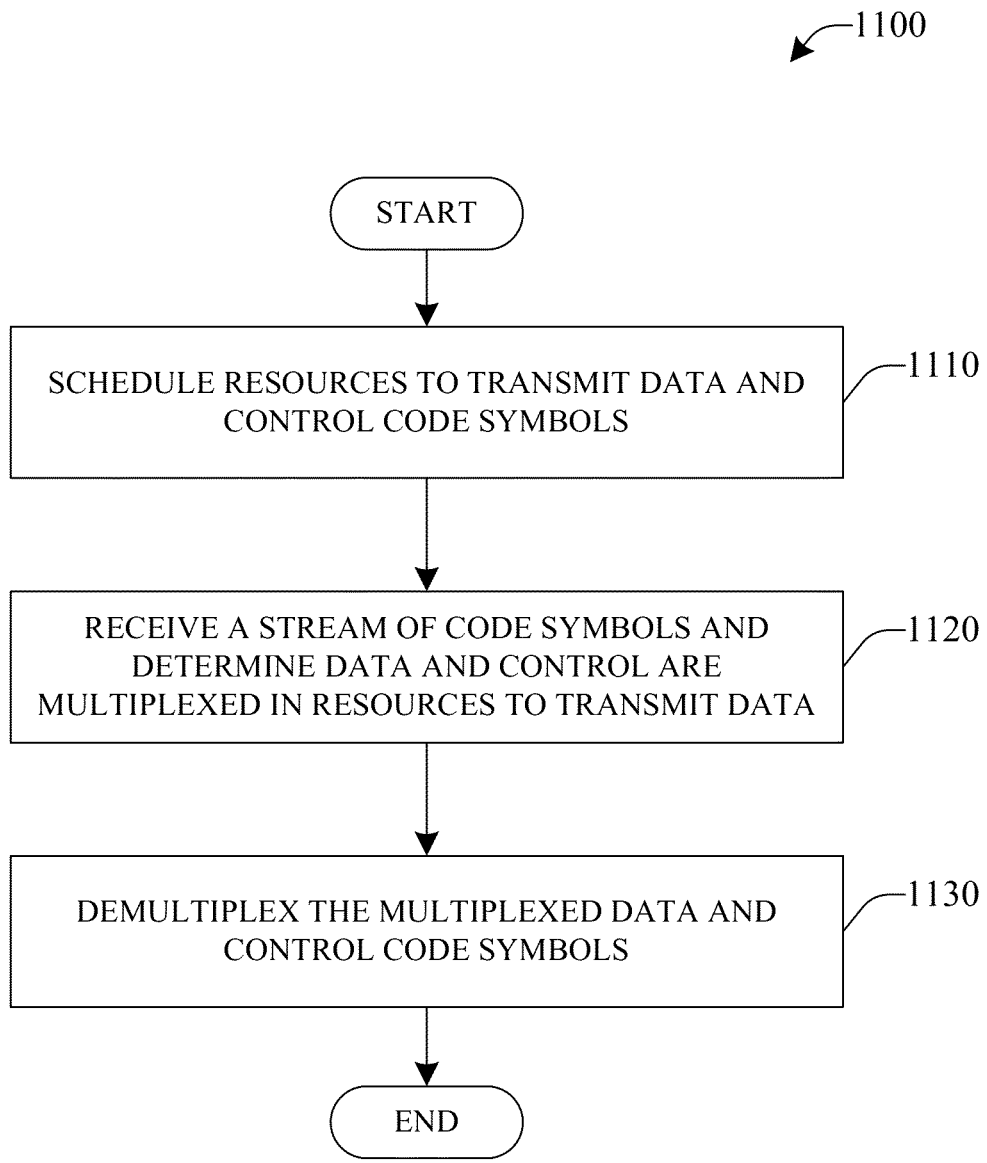
FIG. 11 is a flowchart of an example method for receiving data and control code symbols.

In view of the example systems shown and described above, methodologies that may be implemented in accordance with the disclosed subject matter, will be better appreciated with reference to the flow charts of FIGS. 10-11. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 10 presents a flowchart of a method 1000 for transmitting data and control code symbols. At act 1010, an allocation of resources for transmitting data and control code symbols is received. In an aspect, such allocation can be scheduled by a base station (e.g., base station 140), and, depending on channel conditions, number of user in the service cell served by the base stations, etc., the resources can be allocated in a distributed manner or localized manner (FIG. 4C). Validation act 1020 checks whether data and control code symbols are transmitted within a same transmission time interval (TTI). It is noted that validation act 1020 can be performed periodically, e.g., employing the TTI and carrying out validation act 1020 at times that are multiples of the TTI. It should be appreciated that the transmission time interval can correspond to a minimum time interval compatible with a specification of a wireless system in which communication of data and control code symbols take place (e.g., 3G LTE) In the case more than one stream of control symbols is transmitted, control symbols of a stream that are transmitted within the TTI of a disparate, first control stream are also multiplexed with the data. In the affirmative case, at 1030, control and data are multiplexed (e.g., utilizing a multiplexing component such as 131) and transmitted employing the resources allocated to data transmissions. Conversely, at act 1040, data and control symbols are transmitted, respectively, using resources scheduled for data transmissions and dedicated to control transmissions (FIG. 4). It should be appreciated that transmission methodology 1000 retains the single-carrier nature of the transmitted waveform in a wireless systems wherein UP transmissions exploit SC-FMD.

FIG. 11 presents a flowchart of a method 1100 for receiving data and control symbols. Act 1110 results in scheduling resources for transmitting control and data code symbols. In an aspect, such resources are allocated to a terminal (e.g., user equipment 120) based on terminal capabilities, wireless system specifications, such as bandwidth, and number of user in the service cell where the terminal operates. At act 1120, a stream of code symbols is received and it is determined whether data and control code symbols are multiplexed. Such a determination can be performed by a processor (e.g., by processor 143) a base station. At 1130, multiplexed code symbols received trough resources allocated to data transmission are demultiplexed (for example, using demultiplexer component 155).

Next, systems that can enable aspects of the disclosed subjected matter are described in connection with FIGS. 12 and 13. Such systems can include functional blocks, which can be functional blocks that represent functions implemented by a processor or an electronic machine, software, or combination thereof (e.g., firmware).

Figure 12:
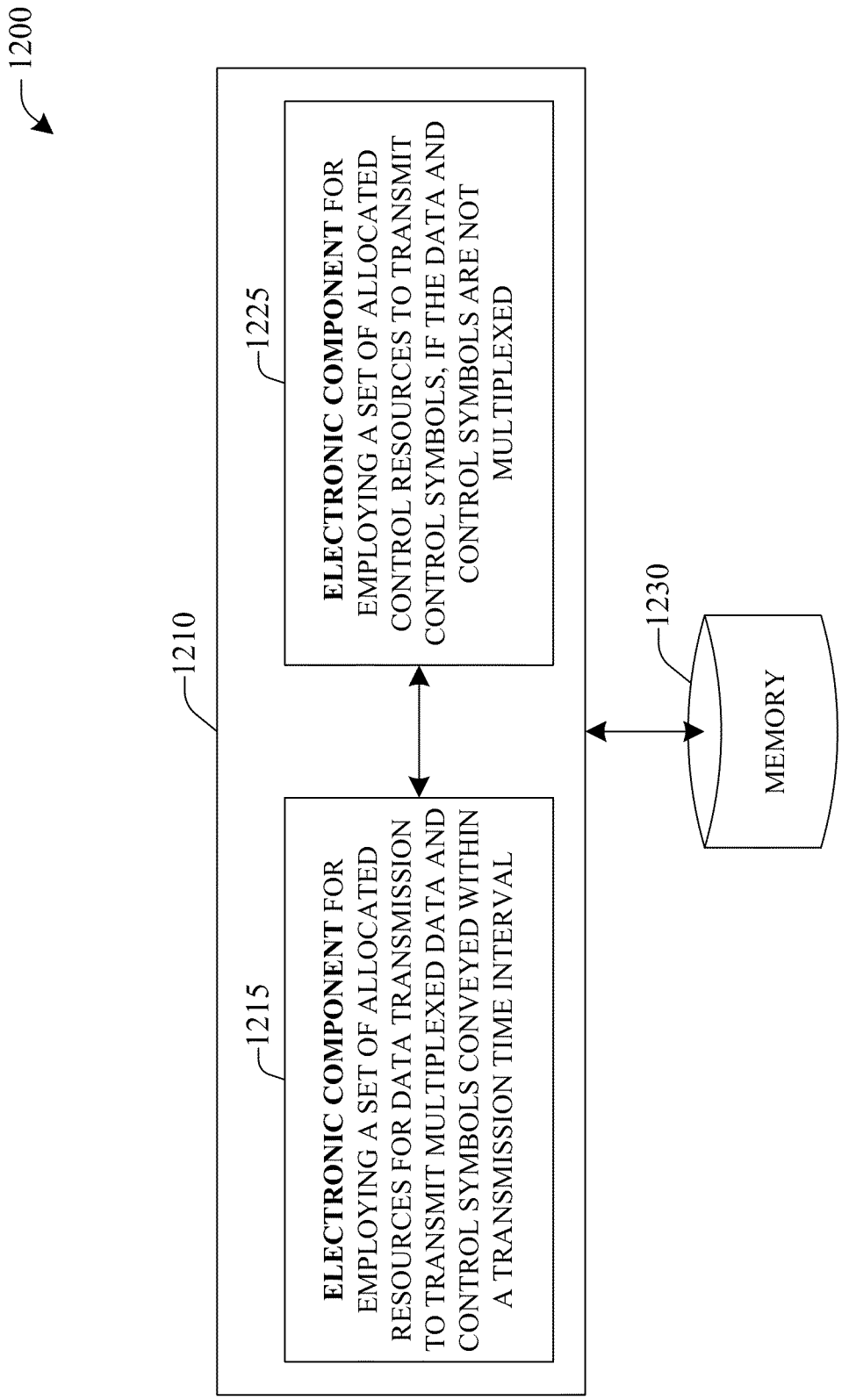
FIG. 12 illustrates an example system that enables employing scheduled resources transmission of data and control code symbols.

FIG. 12 illustrates a system 1200 that enables employing scheduled resources transmission of data and control code symbols. System 1200 can reside, at least partially, within a wireless terminal (e.g., user equipment 120). System 1200 includes a logical grouping 1210 of electronic components that can act in conjunction. In an aspect, logical grouping 1210 includes an electronic component 1215 for employing a set of allocated resources for data transmission to transmit multiplexed data and control symbols conveyed within a transmission time interval (FIGS. 4B and 6). As an example, the resources can be localized resources (FIG. 4C), data code symbols can be transmitted in two subsequent sub-TTI intervals that span a control TTI, wherein control code symbols can be transmitted. Further, logical grouping 1210 can comprise an electronic component 1225 for employing a set of allocated control resources to transmit control symbols, if the data and control symbols are not multiplexed. Additionally, system 1200 can include a memory 1230 that retains instructions for executing functions associated with electrical components 1215 and 1225, as well as data that may be generating during executing such. While shown as being external to memory 1230, it is to be understood that one or more of electronic components 1215 and 1225 can exist within memory 1230.

Figure 13:
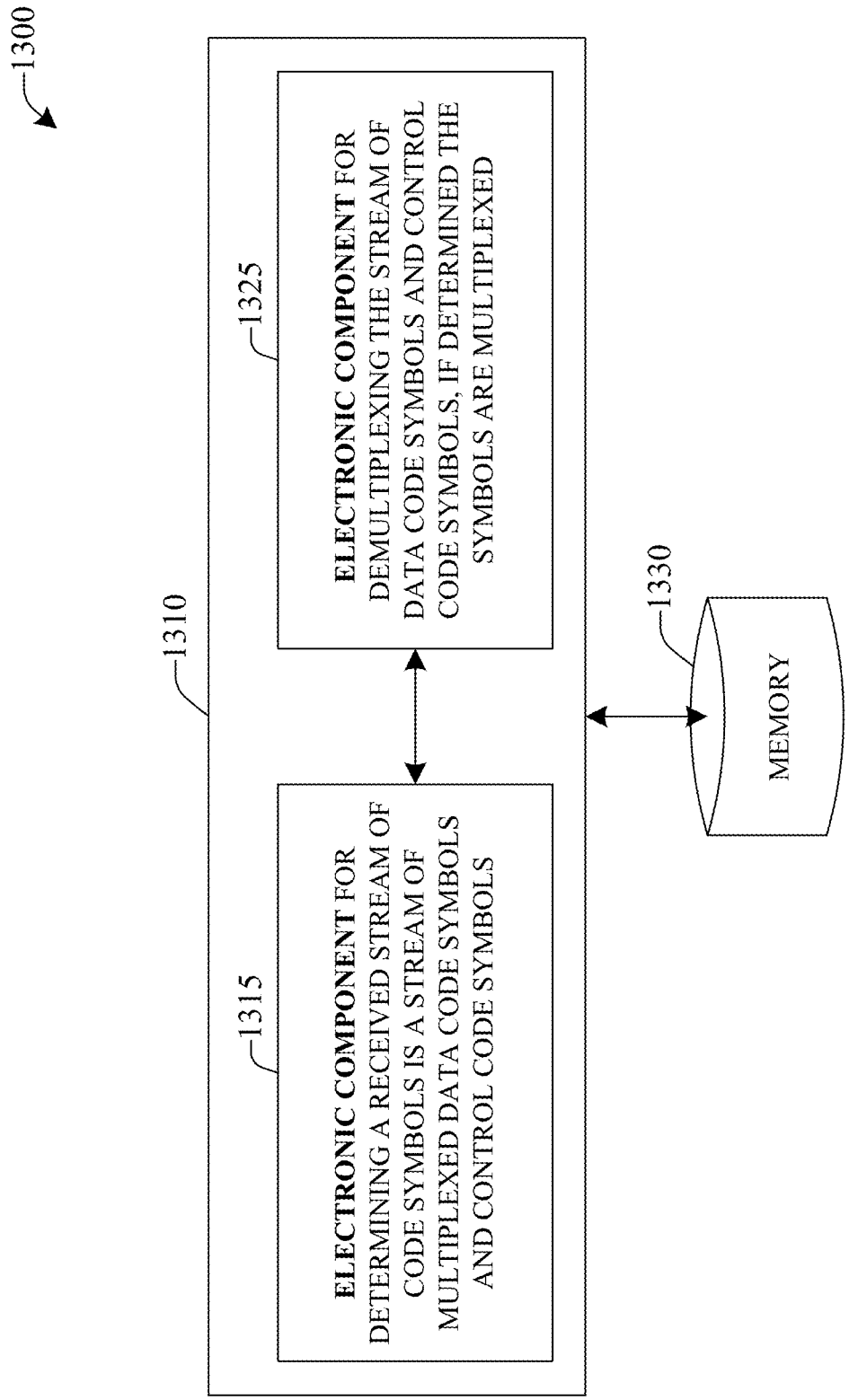
FIG. 13 illustrates an example system that enables determining data and control code symbols are multiplexed, and demultiplexing such symbols

FIG. 13 illustrates a system 1300 that enables determining data and control code symbols are multiplexed, and demultiplexing such symbols. System 1300 can reside, at least partially, within a transmitter (e.g., base station 140) or a wireless terminal (e.g., user equipment 120). System 1300 includes a logical grouping 1310 of electronic components that can act in conjunction. In an aspect, logical grouping 1310 includes an electronic component 1315 for determining a received stream of code symbols is a stream of multiplexed data code symbols and control code symbols. In addition, logical grouping 1310 includes an electronic component 1325 for demultiplexing the stream of data code symbols and control code symbols, if determined the symbols are multiplexed. In an aspect, such electronic component can include DEMUX component 155, which resides in base station 140 (FIG. 1). Additionally, system 1300 can include a memory 1330 that retains instructions for executing functions associated with electrical components 1315 and 1325, as well as data that may be generating during executing such. While shown as being external to memory 1230, it is to be understood that one or more of electronic components 1315 and 1325 can exist within memory 1330.

Various aspects or features described herein may be implemented as a method, apparatus, or article of manufacture using standard programming and/or engineering techniques.

The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system utilized in wireless communications, comprising:
    a processor configured to:
        receive an allocation of resources to transmit data code symbols and control code symbols, wherein transmission of the control code symbols occurs in a primary transmission time interval (TTI) and transmission of the data code symbols occurs in a secondary TTI, wherein said primary TTI exceeds said secondary TTI;
        determine whether the data code symbols and the control code symbols overlap within the secondary TTI;
        upon determining that the data code symbols and the control code symbols overlap within the secondary TTI, multiplex the data code symbols and the control code symbols that overlap within the secondary TTI;
        employ the resources allocated to transmit the data code symbols to convey the multiplexed data code symbols and control code symbols; and
        employ the resources allocated to transmit the control code symbols, if the data code symbols and the control code symbols are not multiplexed; and
    a memory coupled to the processor to store data.

2. The system of claim 1, the processor configured to transmit the data code symbols and the control code symbols in a single-carrier frequency division multiple access mode.

3. The system of claim 1, the processor further configured to multiplex the data code symbols and the control code symbols employing time-division multiplexing or frequency division multiplexing.

4. The system of claim 1, wherein a plurality of disparate secondary TTIs span the primary TTI.

5. The system of claim 4, wherein the data code symbols are transmitted in each secondary TTI within the primary TTI.

6. The system of claim 4, wherein the data code symbols are transmitted every other secondary TTI within the primary TTI.

7. An apparatus utilized in wireless communication systems, the apparatus comprising:
    means for determining whether the data code symbols and the control code symbols overlap within a transmission time interval (TTI) for data transmission;
    upon determining that the data code symbols and the control code symbols overlap within the TTI for data transmission, means for multiplexing the data code symbols and the control code symbols that overlap within the TTI for data transmission;
    means for employing a set of allocated resources for data transmission to transmit the multiplexed data code symbols and control code symbols within the TTI for data transmission; and
    means for employing a set of allocated control resources to transmit the control code symbols, if the data code symbols and the control code symbols are not multiplexed.

8. An apparatus that operates in a wireless communication environment, the apparatus comprising:
    a processor configured to schedule resources for transmitting data code symbols and control code symbols, and to receive the data code symbols multiplexed with the control code symbols, wherein the transmitted multiplexed data code symbols and control code symbols utilize the resources scheduled to transmit the data code symbols, and wherein the data code symbols and the control code symbols are multiplexed based on a determination that the data control symbols and the control code symbols overlap within a time interval; and
    a memory coupled to the processor to store data.

9. The apparatus of claim 8, the processor further configured to receive the control code symbols transmitted in the dedicated resources scheduled to control transmission, if it is determined that the data code symbols and the control code symbols are not multiplexed.

10. The apparatus of claim 8, the processor further configured to transmit data in a first transmission time interval, and receive the control code symbols in a second transmission time interval.

11. The apparatus of claim 10, the processor further configured to transmit the data code symbols in a plurality of transmission time intervals within a step of an N-step hybrid automated repeat request (HARQ), wherein N is natural number greater or equal than 1.

12. The apparatus of claim 8, the scheduled resources for transmitting the data code symbols and the control code symbols are frequency diverse, frequency localized, or a combination thereof.

13. An apparatus that facilitates communication in a wireless environment, the apparatus comprising:
    means for determining that a received stream of code symbols is a stream of multiplexed data code symbols and control code symbols; and
    means for demultiplexing the stream of multiplexed data code symbols and control code symbols, if it is determined that the data code symbols and the control code symbols are multiplexed, wherein the data code symbols and the control code symbols are multiplexed based on a determination that the data code symbols and the control code symbols overlap within a time interval.

14. The apparatus of claim 13, further comprising means for receiving control data code symbols transmitted in a dedicated resource allocation, if the data code symbols and the control code symbols are not multiplexed.

15. A method employed in a wireless communication system, the method comprising:

receiving scheduled resources for transmitting data code symbols and for transmitting control code symbols;

determining at a specific transmission time interval (TTI) whether the data code symbols and the control code symbols overlap within the specific TTI;

upon determining that the data code symbols and the control code symbols overlap within the specific TTI, multiplexing the data code symbols and the control code symbols, and transmitting the multiplexed data code symbols and control code symbols employing the scheduled resources for transmitting data code symbols; and transmitting the control code symbols and the data code symbols on respective scheduled resources, if the data code symbols are not transmitted within the specific TTI.

16. The method of claim 15, the scheduled resources include a minimum transmission time interval consistent with a specification of the wireless communication system.

17. The method of claim 15, the specific TTI is a multiple of the minimum transmission time interval.

18. The method of claim 15, the data code symbols multiplexed with the control code symbols span a plurality of transmission time intervals (TTIs) that when added equal the control TTI.

19. The method of claim 18, further comprising inferring a plurality of data transmission time intervals that optimize transmission latency.

20. The method of claim 15, the multiplexing is an M-to-1 multiplexing of M-1 set of control code symbols and a set of data code symbols, wherein M is a natural number greater than or equal to 1.

21. The method of claim 15, the scheduled resources for transmitting the control code symbols and the data code symbols are frequency localized.

22. The method of claim 15, the scheduled resources for transmitting the control code symbols and the data code symbols are frequency distributed.

23. The method of claim 15, the scheduled resources for transmitting the control code symbols are frequency localized and the resources for transmitting the data code symbols are distributed.

24. The method of claim 15, the scheduled resources for transmitting the control code symbols are frequency distributed and the allocated resources for transmitting the data code symbols are frequency localized.

25. A non-transitory machine-readable medium comprising instructions which, when executed by a machine, cause the machine to perform operations including:

determining whether data code symbols and control code symbols overlap within a control transmission time interval (TTI);

multiplexing the data code symbols and the control code symbols, if the data code symbols are transmitted within the control TTI and if the data code symbols and the control code symbols overlap within the control TTI, and transmitting the multiplexed data code symbols and control code symbols employing a set of scheduled resources for data transmission; and transmitting the control code symbols and the data code symbols on respective sets of scheduled resources, if the data code symbols are not transmitted in the control TTI.

26. A non-transitory machine-readable medium with instructions stored thereon that, when executed by a processor, cause the machine to carry out the following acts:

transmitting a first set of data code symbols in a first transmission time interval (TTI);

receiving control code symbols in a second TTI that encompasses the first TTI; and receiving control code symbols multiplexed with data code symbols from a second set of data code symbols, if the data code symbols in the second set are transmitted within a control TTI and if the data code symbols from the second set of data code symbols overlap with the control code symbols within the control TTI, wherein control code symbols are multiplexed with data code symbols based on a determination that the data code symbols from the second set of data code symbols overlap with the control code symbols within the control TTI.

27. The non-transitory machine-readable medium of claim 26, further storing instructions that, when executed by a processor, perform the act of allocating a set of resources, wherein the resources are frequency diverse or frequency selective.

28. A method employed in a wireless communication environment, the method comprising:

scheduling an allocation of resources for transmitting data code symbols and for transmitting control code symbols;

receiving a stream of code symbols and determining that the data code symbols and the control code symbols are multiplexed in the resources allocated to transmit data code symbols, wherein the data code symbols and the control code symbols are multiplexed based on a determination that the data code symbols and the control code symbols overlap within a time interval; and de-multiplexing the multiplexed data code symbols and the control code symbols in the allocated resources for data transmission.

* * * * *